Oct. 3, 1967  F. Y. GREPE  3,345,550
HOIST MOTOR CONTROL
Filed Feb. 3, 1965
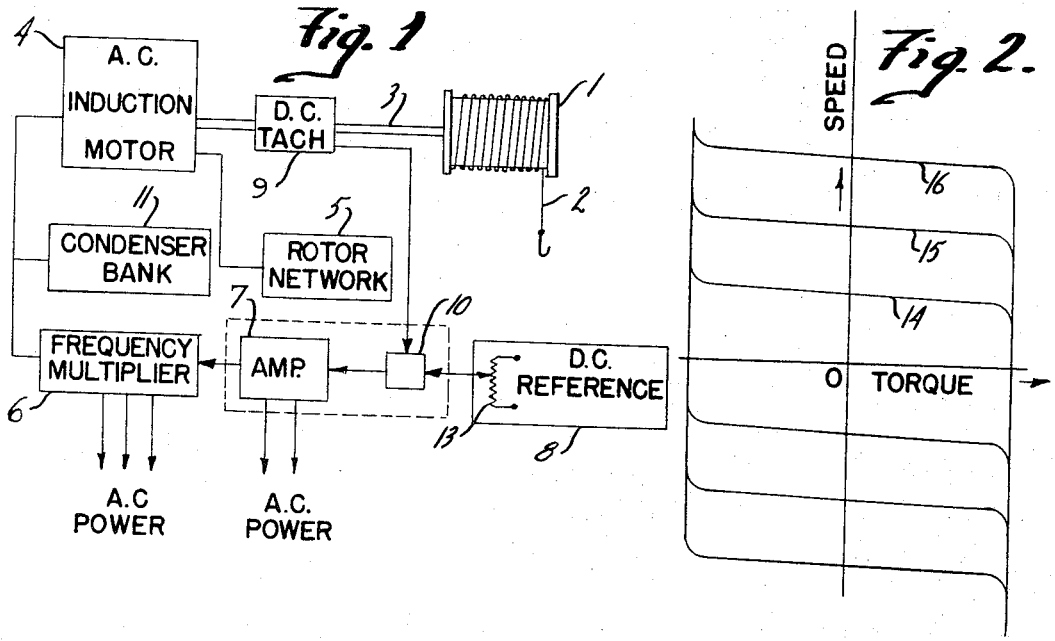
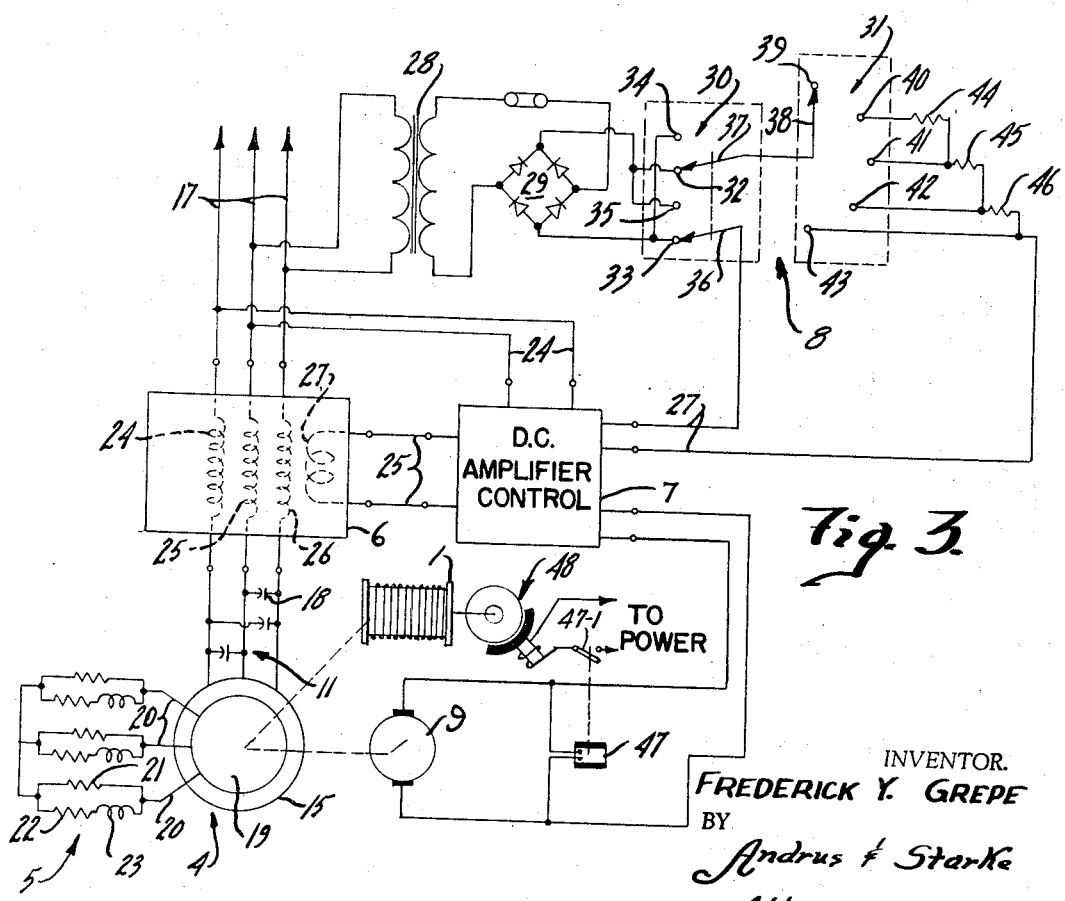
INVENTOR.
FREDERICK Y. GREPE
BY
Andrus & Starke
Attorneys

United States Patent Office 3,345,550
Patented Oct. 3, 1967

3,345,550
HOIST MOTOR CONTROL
Frederick Yorke Grepe, Scarborough, Ontario, Canada, assignor, by mesne assignments, to A. O. Smith Corporation, Milwaukee, Wis., a corporation of New York
Filed Feb. 3, 1965, Ser. No. 430,123
2 Claims. (Cl. 318—229)

This invention relates to material handling control apparatus having an alternating current drive motor and particularly to a crane hoist motor control apparatus and the like for controlling the speed of raising and lowering a load.

Induction wound rotor motors have been satisfactorily employed in hoist control systems. Such motors generally include a rotor resistance network with various resistors selectively connected and disconnected from the circuit to provide control or the speed at which the load is raised and/or lowered. Although such step control is satisfactory, it does dimit the speed to a selected number of increments. Further, the provision of the control circuit with the necessary contactors and interconnecting circuitry increases in complexity and expense directly with the number of steps provided. A wound rotor motor does not inherently protect against runaway under overhauling loads; that is, loads which drive the motor. Consequently, special circuitry such as eddy current brakes, dynamic braking circuits and the like are advisedly provided to prevent such loss of load control and runaway of the hoist mechanism.

The present invention is particularly directed to a simplification in a control for a crane hoist motor and like material handling motors providing improved operating characteristics and particularly providing an inherent control preventing loss of load control and runaway of the load. Generally, in accordance with the present invention, an induction motor having a wound rotor is energized through a frequency multiplier having a direct current control winding which is interconnected to be energized in response to a comparison between a reference signal and a feedback or speed sensed signal. The present invention provides a closed loop, reversible drive control system for a crane hoist which can provide continuous and infinite speed control within the limits of the system, although in certain circuits a simplified stepped control may also be used. This invention results in a simplification in the control equipment as essentially all of the motor circuit contactors are eliminated with the substitution of relatively small direct current related components which are connected to a direct current control winding. The mere switching on and off and the reversal of this direct current will give smooth acceleration and braking of the material handling motor. This results from the well known fact that it is a simple matter to design frequency multipliers such that their output voltage grows relatively slowly when the direct current control voltage is applied instantaneously. As a result, starting and accelerating torque of the motor buids up smoothly from the moment of switching on of the control voltage to the moment when the motor arrives at the steady speed. Similarly, plugging torque develops equally smoothly when the direct current voltage is reversed.

More particularly in accordance with the present invention, an induction motor of the wound rotor type is provided having a resistance-inductance rotor network. The stator of the unit is fed from a frequency multiplier which generally is a magnetic amplifier having primary windings connected to an incoming power source and a secondary winding connected to the stator with a D.C. control winding connected in the magnetic circuit. The output of the frequency multiplier is twice the frequency of the supply. The multiplication correspondingly increases the synchronous speed of a given motor and operation of the motor at rated current therefore makes it necessary to increase the motor voltage proportionately. The horsepower rating of the motor will then also be multiplied. A tachometer or other speed sensing means is coupled to the motor and generates a direct current signal proportional to the actual speed of the motor. The feedback signal is compared or summed to a reference signal which is made adjustable and the net signal is applied to the D.C. winding of the multiplier. The output voltage of the multiplier will control the speed of the motor. In turn, the output speed determines the magnitude of the feedback signal. This will increase with increasing motor speed. The control signal will similarly increase or decrease and if necessary result in an actual automatic plugging of the motor.

The output current of a frequency multiplier cannot exceed a predetermined value depending upon the precise design of the circuit and consequently provides a positive protection against overload of the motor circuit. Further, by limiting the control current to a selected level, the motor current and motor torque will be restricted to corresponding ranges.

The direction of motor rotation is directly related to the polarity of the control signal and consequently raising and lowering of the system can be controlled by mere reversal of the polarity of the control signal applied to the doubler.

The present invention thus provides a very simple and reliable alternating current material handling motor control for crane hoist and the like and may be particularly applied in fields which have been predominantly covered by direct current motors.

The drawings furnished herewith illustrates a preferred construction and system in which the above advantages and features are clearly set forth as well as others which will be clear from the following description.

In the drawing:

FIG. 1 is a block diagram showing a three phase hoist system for raising and lowering a load;

FIG. 2 shows a plurality of speed torque characteristics attainable with the present invention for raising and lowering of the load; and FIG. 3 is a schematic circuit diagram showing a preferred control circuit for operating a hoist motor constructed in accordance with the present invention.

Referring to the drawing and particularly to FIG. 1, a block diagram of a hoist system is illustrated including a hook drum 1 having a cable and hook unit 2 wound thereon for selective lowering and raising of a load, not shown. The hook drum 1 is secured to be driven by an output shaft 3 coupled to an A.C. motor 4 of the wound rotor induction variety. Motor 4 is a reversible motor having a rotor impedance network 5 connected to the rotor circuit and a frequency multiplier 6 connecting the stator to the input power lines. Multiplier 6 is of any known variety adapted to provide an output voltage at multiples of the frequency of the input voltage and providing an output voltage proportional to a direct current (D.C.) input signal which, in the illustrated embodiment of the invention, is derived from an amplifier 7. A direct current reference source 8 is connected as one input to the amplifier 7. A second input thereto is taken from a direct current tachometer 9 which is coupled to the output shaft 3 to provide a direct current signal directly proportional to the speed at which the drum 1 is rotated. The source 8 and the tachometer 9 are interconnected to the amplifier 7 through a summing unit or other similar signal level comparator 10 shown as forming a part of the input circuit of the amplifier 7. As previously noted, the motor 4 includes a rotor impedance network 5 which as hereinafter described will include an inductive portion to create a constant torque characteristic. A condenser bank 11 is connected to the output of the doubler to improve the load characteristic of the system.

In FIG. 1, a continuously adjustable torque control is provided from a potentiometer 13 or other stepless control forming a part of reference source 8.

Generally, each phase of the multiplier 6 functions as a constant open circuit voltage in series with a variable reactance having a value which is directly related to the control current. Therefore, variation of the control current with a resulting variation of the reactance will vary the terminal voltage applied to the motor. In turn, as is well known, variation of the applied voltage will result in a corresponding variation of torque developed by the motor 4 and thereby give a direct speed control operating against a constant load torque as encountered in hoist systems and the like. The output frequency of multiplier 6 is multiples of the input frequency. Consequently, the synchronous speed of the motor is correspondingly increased. By proportionate increase of the motor voltage, the horsepower rating of the motor is also multiplied when the motor operates with rated current.

Further, the direction of rotation of the motor will be directly related to the phase sequence of the three phase multiplier output. In turn, the phase output or sequence is directly related to the polarity of the control current and can be reversed by merely reversing the polarity of the control current.

In operation, with the circuit set for off position, the combined excitation from the tachometer 5 and the reference source 8 is such as to produce zero output voltage from the frequency multiplier 6 with the motor 4 at standstill. When the reference source 8 is moved from the off position to a hoist direction, the output of the frequency multiplier 6 increases as a result of increased D.C. excitation of the multiplier 6 to accelerate the motor 4 until the required speed as measured by the tachometer 9 is achieved. If a lowering direction is desired, the reference source 8 will be such as to reduce the direct current excitation of the frequency multiplier 6 to thereby produce a lowering torque if the load does not overhaul the hoist system or produce a hoisting or braking torque if the load is large enough to overhaul the hoist system. The feed control in the lowering direction operates as a result of counter-torque braking, as shown by the curves of FIG. 2. This type of control is therefore particularly applicable to any control system in which the load will tend to overhaul the hoist or other mechanism.

Referring particularly to FIG. 2, a set of three curves is shown for three different D.C. reference currents applied to the frequency multiplier 6. The three curves are denoted by the numerals 14, 15 and 16, respectively, with curve 14 being for the lowest current, curve 15 for the intermediate current and curve 16 for the maximum D.C. control current. Each reference current provides a definite speed for the motor which is held relatively constant for varying torque.

In operation, the motor accelerates as the control current increases from zero. The steady state operating speed is determined by the intersection of the motor torque and the load torque lines, not shown. The acceleration to the intersection point is directly related to the rate at which the current rises to the final level. To reverse the motor rotation, the control current is reduced to zero and increased with a reverse polarity to a corresponding opposite level. The motor will decelerate towards standstill and then reverse and accelerate to the new steady state operating speed. The speed of reversal will again be dependent upon how fast the control current has been changed. Thus, the output of the motor provides a rapidly rising torque with the acceleration or speed increasing to the selected level when the torque falls to that of the load torque to maintain the speed for any given load. Similarly, if the current is suddenly cut off, the motor acts as a generator and products a reverse torque providing automatic braking or plugging to a standstill. As shown in FIG. 2, the torque versus speed characteristics for each of the reference currents passes the zero torque line in a smooth fashion and clearly shows the automatic braking when an overhauling load is encountered. This is of substantial significance as providing one of the most basic requirements of a good crane and crane hoist control.

Current and torque peaks which are often encountered in the standard rotor resistance control scheme are avoided by the present invention because of the more favorable torque-speed characteristics and the delaying effect of the multiplier time constant.

The output current of a multiplier cannot exceed a certain predetermined value. Hence, the multiplier provides a completely reliable over-current protection for the motor. Limiting the D.C. control current to a selected level will correspondingly limit the motor current and motor torque.

Referring particularly to FIG. 3, a step type control circuit for energizing the multiplier is shown in somewhat greater detail. Generally, the multiplier amplifiers of FIG. 1 are well known elements and no further detailed description thereof is given. Further, corresponding elements in FIGS. 1 and 3 are correspondingly numbered for simplicity and clarity of explanation.

Referring to FIG. 3, the illustrated induction motor 4 includes a stator section or a stator 15 and its input connected to the static frequency multiplier 6 which in turn is connected to 60 cycle three phase alternating current power lines 17. The condenser bank 11 includes separate condensers 18 connected one each across the three phases input lines connecting the stator 15 to multiplier 6. The motor 4 further includes a rotor 19 rotatably mounted within the stator 15 and coupled to drive the drum 1. The rotor impedance network 5 is connected to the rotor via lines 20 and includes three similar phases circuits. Each phase of the three phase rotor network 5 includes a resistance 21 connected in parallel with a series connection of a resistor 22 and an inductor 23. It has been found that the resistance-inductance network in combination with the frequency multiplier input circuit provides a very stable operating system having good speed regulation. Generally, the motor characteristics are similar to those which are usually obtained only through the conventional Ward-Leonard system. The condenser bank 11 compensates for the inductive load characteristic resulting from the inductance in the rotor network 5.

The multiplier 6 may be any suitable construction including a known magnetic multiplier arrangement of transformer phase windings and a control winding. As frequency multipliers are well known, the illustrated multiplier is shown schematically with three secondary phase windings 24, 25 and 26 and a control winding 27 magnetically coupled thereto. The windings 24, 25 and 26 connect the stator 15 to lines 17 to energize the motor with the frequency and voltage of twice that of the line voltage multipliers. The amplitude of the energizing power is proportional to and controlled by the direct current energization of the control winding 27. As such multipliers are well known, no further description is believed necessary to a full and complete understanding of the present invention.

The control winding 27 is energized in the embodiment of FIG. 3 by the output of amplifier 7.

The amplifier 7 may also be of any suitable or known variety and is shown in block diagram with an alternating current input connected across one phase of the incoming main leads 17. The input power is rectified and impressed upon the control winding 27 of the frequency multiplier 6 as presently described to provide a direct current control current related to a reference signal from source 8 and a signal from the tachometer 9.

The reference source 8 is shown including an input transformer 28 connected directly to one phase of the incoming main power lines 17 with the output of the transformer rectified by a suitable full wave rectifying bridge 29.

A directional switch 30 and a five point speed control switch 31 are connected in series between the output of the full wave bridge rectifier 29 and the input to the amplifier 7.

The directional switch 30 is a double-pole, double-throw switch having a pair of forward contacts 32 and 33 connected to opposite sides of the output of the full wave bridge rectifier and a pair of reverse contacts 34 and 35 similarly connected to the opposite sides of the full wave rectifier. Poles 36 and 37 of the switch 30 are ganged to simultaneously and alternately engage the forward contacts 32 and 33 or the reverse contacts 34 and 35. The poles 36 and 37 are thus connected to opposite sides of the full wave bridge rectifier in either position but with a reverse polarity. Pole 36 is connected directly to amplifier 7 while pole 37 is connected thereto to switch 31.

Switch 31 is a single-pole, multiple-contact switch including a contact pole 38 connected to the corresponding pole 37 of switch 30. Additionally, switch 31 includes an off or dead contact 39 and inching contact 40, a low speed contact 41, a medium speed contact 42 and a high speed contact 43. Contacts 39 through 43 are connected to the opposite reference lead 27 in parallel. Additionally, resistors 44, 45 and 46 are connected in series in the leads to contacts 40, 41 and 42 in a cumulative manner such that when the pole 38 engages the inching contact 40, all of the resistors are connected in series in the circuit. When the pole 38 engages the low speed contact 41, only the latter two resistors 45 and 46 are connected in circuit and when the medium feed contact 42 is connected in circuit, the single resistor 46 is connected in circuit. The high speed contact 43 is a direct connection to provide maximum current to the amplifier 7.

Additionally, the tachometer 9, shown as a small direct current generator, is connected to amplifier 7 and produces a direct current signal which is compared to the reference signal and produces a control signal impressed upon winding 27. The phase and magnitude of the control signal is related to the phase and magnitude of the reference signal.

Additionally, an overspeed relay 47 is connected in parallel with the tachometer 9 and includes contacts 47-1 in the energizing circuit of a friction brake 48 or the like. If the speed of motor 4 increases beyond a selected value, the output of tachometer 9 is sufficient to pull in relay 47 and actuate the friction brake 48. Relay 47 may also operate to discontinue energization of the motor 4. This provides a very simple and reliable means to protect against undue over-speeding of the hoist.

Generally, the embodiment of the invention illustrated in FIG. 3 functions in the same manner as the embodiment of FIG. 1. In FIG. 3, the directional switch 30 is positioned to connect the rectifier with a forward or reverse polarity by movement of the ganged poles 36 and 37. The control current from the amplifier 7 is of a corresponding polarity and directly determines the phase sequence of the output of multiplier 6. This creates the proper directional rotation of the motor 15. The rotation of the rotor 19 drives the tachometer 9 in a corresponding direction to provide a signal of a proper polarity which is compared to the reference signal and at the selected speed provides proper excitation of the motor 4. If the speed varies therefrom, the feedback signal modifies the control signal in a direction to reverse the motor action toward the set speed.

The speed at which the rotor 10 rotates is determined directly by the setting of the speed selection switch 31 with respect to the several contacts 40-43. If desired, the selection switch 31 can of course be a potentiometer device or other similar control to provide a continuous or infinite control of speed and torque.

A hoist limit switch with a suitable bypass switch to allow backing out of the hook and similar controls can be incorporated readily into the control of the present invention. Such details will be readily apparent to those skilled in the art and have not therefore been specifically shown herein.

The present invention thus provides a highly reliable and simple means of providing a hoist control system having all of the advantages of prior devices while providing many improvements in the simplicity of the control system. The present invention completely eliminates the contactors and commutators of prior art methods with the resulting expense, particularly service and maintenance expense. A stepless control for both hoisting and lowering motion can be provided with a very smooth acceleration and deceleration in contrast to prior art means having a sawtooth torque variation. This is particularly desirable in hoist units to eliminate swinging of the load and the lke. The system provides an inherent current limiting feature to prevent excessive motor currents as a result of the inherent characteristic of the multiplier and thereby essentially eliminates the severe problem of motor burnout. The present invention inherently provides off-point counter torque braking which will greatly assist the holding of the hoist or other system in any selected off position. The present invention thus provides all of the above advantages and features in crane controls, movable bridge controls and skip hoists as well as other hoist systems wherein the load tends to overhaul the positioning mechanism.

Various modes of carrying out the invention are contemplated as being within the scope of the following claims particularly pointing out and distinctly claiming the subject matter which is regarded as the invention.

I claim:

1. In a hoist motor control system for a hoist and the like having a characteristic wherein the load drives the motor,
   an induction wound rotor motor having fixed rotor network impedance circuits and having input power lines,
   a magnetic frequency multiplier having load windings inserted in said power lines to control the power to the motor and thereby the torque versus speed characteristic, said frequency multiplier means including a direct current control winding magnetically coupled to the load windings,
   a speed responsive means adapted to be coupled to be driven in timed relation by the load and producing proportionate direct current signals,
   a direct current source having a continuously adjustable means to establish selected output control signals related to the output of the speed responsive means, and
   a comparison circuit having a pair of inputs connected to the speed responsive means and to the direct current source and having an output connected to the direct current control winding to determine the power application to the motor, and
   an electroresponsive safety means connected to the speed responsive means and interconnected to the motor to produce an override control in the event the motor speed increases above a selected speed.

2. In a hoist control for raising and lowering a load,
   a hoist drum,
   a rotor wound induction motor having a three phase rotor network and a three phase stator, each phase of said rotor network including a resistor in parallel with a series connected resistor and inductor,
   a magnetic frequency multiplier having a three phase load winding serially connected to the three phase stator and having a direct current control winding, capacitive means connected in circuit between the multiplier and the stator,
a direct current tachometer coupled to the output shaft of the motor and generating a direct current signal of a polarity related to the direction of rotation and a magnitude proportional to the speed of rotation,
a direct current reference source,
a direction selection switch connected to the source for producing a signal of opposite polarity,
a speed selection means connected to the selection switch to vary the magnitude of the signal, and
a signal summing means having a first input means connected to the speed selection means and a second input connected to the tachometer and including means to produce an amplified direct current output signal having a polarity corresponding to the higher of the signals from the tachometer and the reference source.

References Cited

UNITED STATES PATENTS

| | | | |
|---|---|---|---|
| 2,395,389 | 2/1946 | Huge | 321—69 |
| 2,676,292 | 4/1954 | Spencer | 318—229 |
| 2,894,191 | 7/1959 | Charbonneaux | 318—229 |
| 3,076,126 | 1/1963 | Schurr et al. | 318—229 X |
| 3,209,226 | 9/1965 | Foote | 318—229 |

ORIS L. RADER, *Primary Examiner.*

G. RUBINSON, *Assistant Examiner.*